United States Patent
Shiomi et al.

(10) Patent No.: US 12,198,542 B2
(45) Date of Patent: Jan. 14, 2025

(54) METHOD FOR GENERATING LEARNED MODEL, NON-TRANSITORY STORAGE MEDIUM, AND TRAFFIC JAM PREDICTING DEVICE

(71) Applicant: TOYOTA JIDOSHA KABUSHIKI KAISHA, Toyota (JP)

(72) Inventors: Ayumu Shiomi, Toyota (JP); Atsushi Miyagawa, Toyota (JP); Hiroki Takeuchi, Toyota (JP); Toshiyuki Kawai, Kariya (JP); Ryosuke Fukaya, Toyota (JP); Hiroyuki Tokita, Toyota (JP); Yusuke Ikenoue, Takahama (JP); Naoyuki Saka, Toyota (JP); Tsukasa Kato, Toyota (JP); Katsuhisa Yoshikawa, Toki (JP); Shugen Yamamura, Miyoshi (JP); Takayuki Akaishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/059,468

(22) Filed: Nov. 29, 2022

(65) Prior Publication Data
US 2023/0222900 A1  Jul. 13, 2023

(30) Foreign Application Priority Data
Jan. 11, 2022 (JP) ................. 2022-002614

(51) Int. Cl.
G08G 1/01 (2006.01)
G06N 20/20 (2019.01)
G08G 1/052 (2006.01)

(52) U.S. Cl.
CPC ........... *G08G 1/0133* (2013.01); *G06N 20/20* (2019.01); *G08G 1/0112* (2013.01); *G08G 1/052* (2013.01)

(58) Field of Classification Search
None
See application file for complete search history.

(56) References Cited

U.S. PATENT DOCUMENTS

| 2012/0047102 A1 | 2/2012 | Petersen et al. |
| 2012/0109506 A1 | 5/2012 | Fei et al. |

(Continued)

FOREIGN PATENT DOCUMENTS

| JP | 2009251969 A | 10/2009 |
| JP | 2014191578 A | 10/2014 |

(Continued)

*Primary Examiner* — Jonathan L Sample
*Assistant Examiner* — Alan Lindsay Ostrow
(74) *Attorney, Agent, or Firm* — Dickinson Wright, PLLC

(57) ABSTRACT

A method includes, by a processor, acquiring number of persons information that indicates a number of users, including users who ride in vehicles, who depart from a facility at each of a predetermined time period, weather information for each predetermined time period, and vehicle information relating to vehicles traveling in a periphery of the facility, determining traffic jam status that indicates absence/presence of a traffic jam on a road located in a vicinity of the facility in the predetermined time period, by using the vehicle information; and generating a learned model for predicting a traffic jam of a road by machine learning using, as teaching data, the number of persons information, the weather information, and the traffic jam status that is associated with the number of persons information and the weather information.

8 Claims, 14 Drawing Sheets

(56) References Cited

U.S. PATENT DOCUMENTS

| | | |
|---|---|---|
| 2014/0222321 A1 | 8/2014 | Petty et al. |
| 2014/0278031 A1* | 9/2014 | Scofield ............. G01C 21/3461 |
| | | 701/118 |
| 2015/0168169 A1* | 6/2015 | Caceres ............... G08G 1/0133 |
| | | 701/400 |
| 2016/0247397 A1* | 8/2016 | Xu ....................... G08G 1/0125 |
| 2016/0267789 A1 | 9/2016 | Fowe |
| 2017/0072850 A1* | 3/2017 | Curtis .................. G08G 1/0112 |
| 2017/0256162 A1 | 9/2017 | Schilling et al. |
| 2021/0019376 A1* | 1/2021 | Neubauer ............ G08G 1/0129 |
| 2021/0312375 A1 | 10/2021 | Khasis |
| 2022/0165151 A1* | 5/2022 | Jumonji ................ G08G 1/052 |

FOREIGN PATENT DOCUMENTS

| | | |
|---|---|---|
| JP | 2019169028 A | 10/2019 |
| JP | 2021018697 A | 2/2021 |
| JP | 2021182332 A | 11/2021 |

* cited by examiner

FIG.6

| | TIME RANGE | SEGMENT | | | | | | | | | | | RESULTS OF DETERMINING |
|---|---|---|---|---|---|---|---|---|---|---|---|---|---|
| | | A | B | C | D | E | F | G | H | I | J | K | ABSENCE/PRESENCE OF TRAFFIC JAM |
| | | 0m ~50m | 50m ~100m | 100m ~150m | 150m ~200m | 200m ~250m | 250m ~300m | 300m ~350m | 350m ~400m | 400m ~450m | 450m ~500m | 500m ~550m | |
| a | 16:00~16:15 | 5.0 | - | - | - | - | - | - | - | - | - | - | NO |
| b | 16:15~16:30 | 4.9 | 4.0 | 3.0 | 5.0 | 2.1 | 5.0 | 3.0 | 4.9 | 4.1 | 4.0 | 5.0 | NO |
| c | 16:30~16:45 | 1.1 | 23.2 | 5.1 | 7.4 | 2.6 | 6.0 | 4.0 | 5.3 | 3.9 | 7.0 | 6.0 | NO |
| d | 16:45~17:00 | 107.3 | 7.3 | 5.7 | 7.0 | 2.3 | 6.0 | 4.0 | 4.5 | 3.5 | - | 8.0 | NO |
| e | 17:00~17:15 | 56.6 | 84.3 | 7.6 | 42.2 | 6.7 | 97.6 | 10.7 | 31.5 | 8.3 | - | 64.5 | YES |
| f | 17:15~17:30 | 106.1 | 28.1 | 34.8 | 27.6 | 5.2 | 42.0 | 30.8 | 38.0 | - | - | 5.5 | YES |
| g | 17:30~17:45 | 84.4 | 82.8 | 19.5 | 12.8 | 5.5 | 9.0 | 4.7 | 6.0 | - | - | 6.1 | YES |
| h | 17:45~18:00 | 7.1 | 74.0 | 23.6 | 12.9 | 34.4 | 42.3 | 27.6 | 55.2 | 6.4 | 51.8 | 115.0 | YES |
| ... | ... | ... | ... | ... | ... | ... | ... | ... | ... | ... | ... | ... | ... |

FIG.7

| DATE | TIME RANGE | | WEATHER INFORMATION | | LEARNING DATA | ATTENDANCE RECORD INFORMATION | | | | | RESULTS OF DETERMINING |
|---|---|---|---|---|---|---|---|---|---|---|---|
| | | | CALENDAR | WEATHER | PRECIPITATION AMOUNT | ATTENDANCE RATE | NUMBER OF PERSONS LEAVING WORK | NUMBER OF PERSONS WHO LEFT ONE TIME PERIOD BEFORE | NUMBER OF PERSONS WHO LEFT TWO TIME PERIODS BEFORE | NUMBER OF PERSONS WHO LEFT THREE TIME PERIODS BEFORE | TRAFFIC JAM STATUS |
| 4/1 | a | 16:00~16:15 | BEGINNING OF THE MONTH | RAIN | 26.5mm | 85.3% | 17 PERSONS | 0 PERSONS | 0 PERSONS | 0 PERSONS | NO |
| | b | 16:15~16:30 | | | | | 18 PERSONS | 17 PERSONS | 0 PERSONS | 0 PERSONS | NO |
| | c | 16:30~16:45 | | | | | 27 PERSONS | 18 PERSONS | 17 PERSONS | 0 PERSONS | NO |
| | d | 16:45~17:00 | | | | | 25 PERSONS | 27 PERSONS | 18 PERSONS | 17 PERSONS | NO |
| | e | 17:00~17:15 | | | | | 79 PERSONS | 25 PERSONS | 27 PERSONS | 18 PERSONS | YES |
| | f | 17:15~17:30 | | | | | 74 PERSONS | 79 PERSONS | 25 PERSONS | 27 PERSONS | YES |
| ... | ... | ... | ... | ... | ... | ... | ... | ... | ... | ... | ... |

FIG.8

| DATE | TIME RANGE | | SET DATA | | | | ESTIMATION RESULTS | | | |
|---|---|---|---|---|---|---|---|---|---|---|
| | | | WEATHER INFORMATION | | | ESTIMATED ATTENDANCE RATE | ESTIMATED NUMBER OF PERSONS LEAVING WORK | NUMBER OF PERSONS WHO LEFT ONE TIME PERIOD BEFORE | NUMBER OF PERSONS WHO LEFT TWO TIME PERIODS BEFORE | NUMBER OF PERSONS WHO LEFT THREE TIME PERIODS BEFORE |
| | | | CALENDAR | WEATHER | PRECIPITATION AMOUNT | | | | | |
| 12/1 | a | 16:00~16:15 | BEGINNING OF THE MONTH | CLEAR | 0.0mm | 89.1% | 15 PERSONS | 0 PERSONS | 0 PERSONS | 0 PERSONS |
| | b | 16:15~16:30 | | | | | 17 PERSONS | 15 PERSONS | 0 PERSONS | 0 PERSONS |
| | c | 16:30~16:45 | | | | | 23 PERSONS | 17 PERSONS | 15 PERSONS | 0 PERSONS |
| | d | 16:45~17:00 | | | | | 24 PERSONS | 23 PERSONS | 17 PERSONS | 15 PERSONS |
| | e | 17:00~17:15 | | | | | 80 PERSONS | 24 PERSONS | 23 PERSONS | 17 PERSONS |
| | f | 17:15~17:30 | | | | | 75 PERSONS | 80 PERSONS | 24 PERSONS | 23 PERSONS |
| ... | | ... | ... | ... | ... | ... | ... | ... | ... | ... |

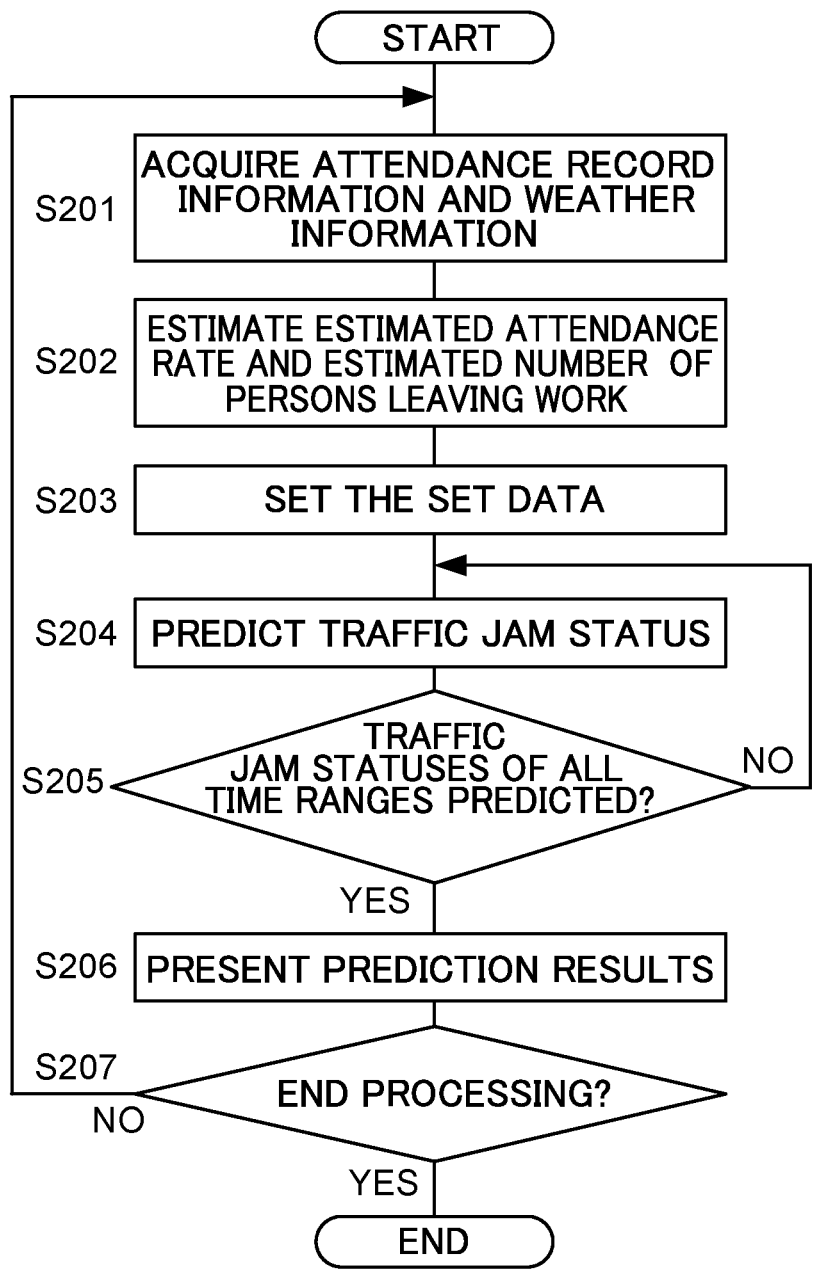

METHOD FOR GENERATING LEARNED MODEL, NON-TRANSITORY STORAGE MEDIUM, AND TRAFFIC JAM PREDICTING DEVICE

CROSS-REFERENCE TO RELATED APPLICATION

This application is based on and claims priority under 35 USC 119 from Japanese Patent Application No. 2022-002614 filed on Jan. 11, 2022, the disclosure of which is incorporated by reference herein.

BACKGROUND

Technical Field

The present disclosure relates to a method for generating a learned model that predicts the status of congestion of a road, and to a non-transitory storage medium and a traffic jam predicting device.

Related Art

Japanese Patent Application Laid-Open (JP-A) No. 2014-191578 for example discloses a road traffic server that collects position information and individual information of vehicles from the vehicles, and predicts the current and future amounts of traffic on the moving path of a vehicle on the basis of the collected position information and individual information. On the basis of information acquired from plural vehicles and from terminals possessed by users riding in vehicles, the road traffic server predicts the current amount of traffic and amounts of traffic several hours ahead into the future, and presents this information to users.

Traffic jams are a huge social problem, and good techniques for predicting traffic jams are required. In conventional techniques, the statuses of traffic jams that change dynamically are predicted on the basis of information acquired from plural vehicles that are actually traveling on roads.

However, these techniques are confined to being able to predict traffic jam statuses of up to the very near future (e.g., several hours later) that change dynamically, and cannot necessarily predict traffic jam statuses of over a longer period of time such as several days ahead or the like.

SUMMARY

The present disclosure provides a method for generating a learned model that predicts the situation of a road over a long period of time, and a non-transitory storage medium and a traffic jam predicting device.

A method of a first aspect includes: by a processor, acquiring number of persons information that indicates a number of users, including users who ride in vehicles, who depart from a facility at each of a predetermined time period, weather information for each predetermined time period, and vehicle information relating to vehicles traveling in a periphery of the facility; determining traffic jam status that indicates absence/presence of a traffic jam on a road located in a vicinity of the facility in the predetermined time period, by using the vehicle information; and generating a learned model for predicting a traffic jam of a road by machine learning using, as teaching data, the number of persons information, the weather information, and the traffic jam status that is associated with the number of persons information and the weather information.

The method of the first aspect acquires number of persons information that indicates the number of users departing from the facility, weather information, and vehicle information of vehicles traveling on a road located in a vicinity of the facility. From the vehicle information, the machine learning method determines the traffic jam information of the road located in a periphery of the facility, and causes a learning model to machine-learn the relationship between the acquired number of persons information and the determined traffic jam information. Here, the facility is a company or a commercial facility or the like, and the users who depart from the facility are users leaving work from a company, or users leaving a facility and returning home, or the like. Due thereto, a learned model that can predict the situation of a road over a long period of time can be generated.

In a method of a second aspect, in the method of the first aspect, the number of persons information includes a number of users relating to a time period that is before a time period in which the traffic jam status is determined.

In accordance with the method of the second aspect, the time from departing the facility until arriving at a road greatly contributes to the traffic jam status. A learned model, which can carry out prediction by taking into consideration factors that more greatly affect the traffic jam status, can be generated.

In a method of a third aspect, in the method of the first aspect or the second aspect, the vehicle information includes position information relating to a position of the vehicle and speed information relating to a speed of the vehicle, and the determining of the traffic jam status uses the position information and the speed information.

In accordance with the method of the third aspect, a learned model that can determine the traffic jam status can be generated without being affected by bad weather or the time range, such as nighttime or the like, or the like.

In a method of a fourth aspect, in the method of the third aspect, the method further includes deriving a needed time that is needed in order to pass through a predetermined segment by using the position information and the speed information, and judging the traffic jam status to be that there is a traffic jam in a case in which there exists, in continuation, a predetermined number of segments whose needed time is greater than or equal to a threshold value.

In accordance with the method of the fourth aspect, standards indicating a traffic jam are clarified, and a learned model that can determine the traffic jam status more accurately can be generated.

In a method of a fifth aspect, in the method of any one of the first aspect through the fourth aspect, the learned model is a model using a random forest.

In accordance with the method of the fifth aspect, a learned model that can predict the traffic jam status more accurately than other machine-learned models can be generated.

A non-transitory storage medium of a sixth aspect stores a program that causes a processor to execute processing that, by using the learned model generated by the method of any one of the first aspect through the fifth aspect, predicts the traffic jam status of a road located in a vicinity of the facility by inputting the weather information and estimated number of persons information that indicates a number of users, including users who ride in vehicles, who are estimated to have departed from the facility in each predetermined time period.

In accordance with the non-transitory storage medium of the sixth aspect, the situation of a road over a long period of time can be predicted.

A traffic jam predicting device of a seventh aspect includes: a memory that serves as the non-transitory storage medium of the sixth aspect; and a processor coupled to the memory, wherein the processor is configured to: estimate the estimated number of persons information in an object time period for which prediction of the traffic jam status is to be carried out, and predict the traffic jam status in the object time period by inputting the estimated number of persons information and the weather information to the learned model.

In accordance with the traffic jam predicting device of the seventh aspect, the burden on a user can be reduced in the processing that predicts the traffic jam status.

In a traffic jam predicting device of an eighth aspect, in the traffic jam predicting device of the seventh aspect, the processor is configured to estimate the estimated number of persons information in the object time period by using a past number of users who have visited the facility.

In accordance with the traffic jam predicting device of the eighth aspect, the number of visiting persons who visit a facility on a day relating to the object time period is estimated from a past number of visiting persons. The number of persons information of the persons departing the facility in the object time period can be estimated from the estimated number of visiting persons. Namely, traffic jam information can be predicted by estimating the number of persons who will visit in the future.

In a traffic jam predicting device of a ninth aspect, in the traffic jam predicting device of the seventh aspect or the eighth aspect, the processor is configured to present the estimated traffic jam status of each object time period.

In accordance with the traffic jam predicting device of the ninth aspect, a user can be made to recognize the predicted traffic jam status.

In accordance with the present disclosure, the situation of a road over a long period of time can be predicted.

BRIEF DESCRIPTION OF THE DRAWINGS

Exemplary embodiments of the present invention will be described in detail based on the following figures, wherein:

FIG. 6 is a drawing that illustrates the average needed time that is needed in order for a vehicle to pass through, per segment and per time range, and that is provided in order to explain traffic jam status estimation relating to the present embodiment;

FIG. 7 is a drawing illustrating the structure of learning data relating to the present embodiment;

FIG. 8 is a drawing illustrating the structure of set data relating to the present embodiment;

FIG. 14 is a flowchart illustrating the flow of traffic jam status predicting processing that is executed at the central server of the present embodiment.

DETAILED DESCRIPTION

Described hereinafter is a traffic jam predicting system of the present disclosure that includes a vehicle equipped with an onboard device, a central server that serves as a traffic jam predicting device, and an information providing server that provides weather information indicating the weather and attendance record information indicating records of attendance. By using the number of persons going to work of workers who go to work at a facility that includes workers who commute by using vehicles, and the number of persons leaving work who leave the facility per predetermined time period (time range), the traffic jam predicting system carries out the processing of predicting the traffic jam status of a road that is located a vicinity of the facility, per predetermined time period (time range).

Here, the number of persons leaving work who leave the facility relating to the present embodiment is an example of the "information of the number of persons departing the facility". Further, the "going to work" relating to the present embodiment is an example of "visiting". Note that the facility relating to the present embodiment is described as being an office of a company, but is not limited to this. The facility may be a commercial facility in which plural shops are located, or a leisure facility such as an amusement park or the like. In this case, the traffic jam predicting system relating to the present embodiment predicts, per predetermined time period (time range), the traffic jam status of a road located in the vicinity of the commercial facility or the leisure facility, from the number of persons coming to the commercial facility or the leisure facility, and the number of persons leaving therefrom per predetermined time period (time range). Note that the predetermined time period for which the situation of the road is predicted is called the "time range" hereinafter. Further, the "road that is located in a vicinity" relating to the present embodiment is a road that is directly or indirectly connected to the facility, and is a road located within a predetermined distance range from the facility.

(Overall Structure)

Figure 1:
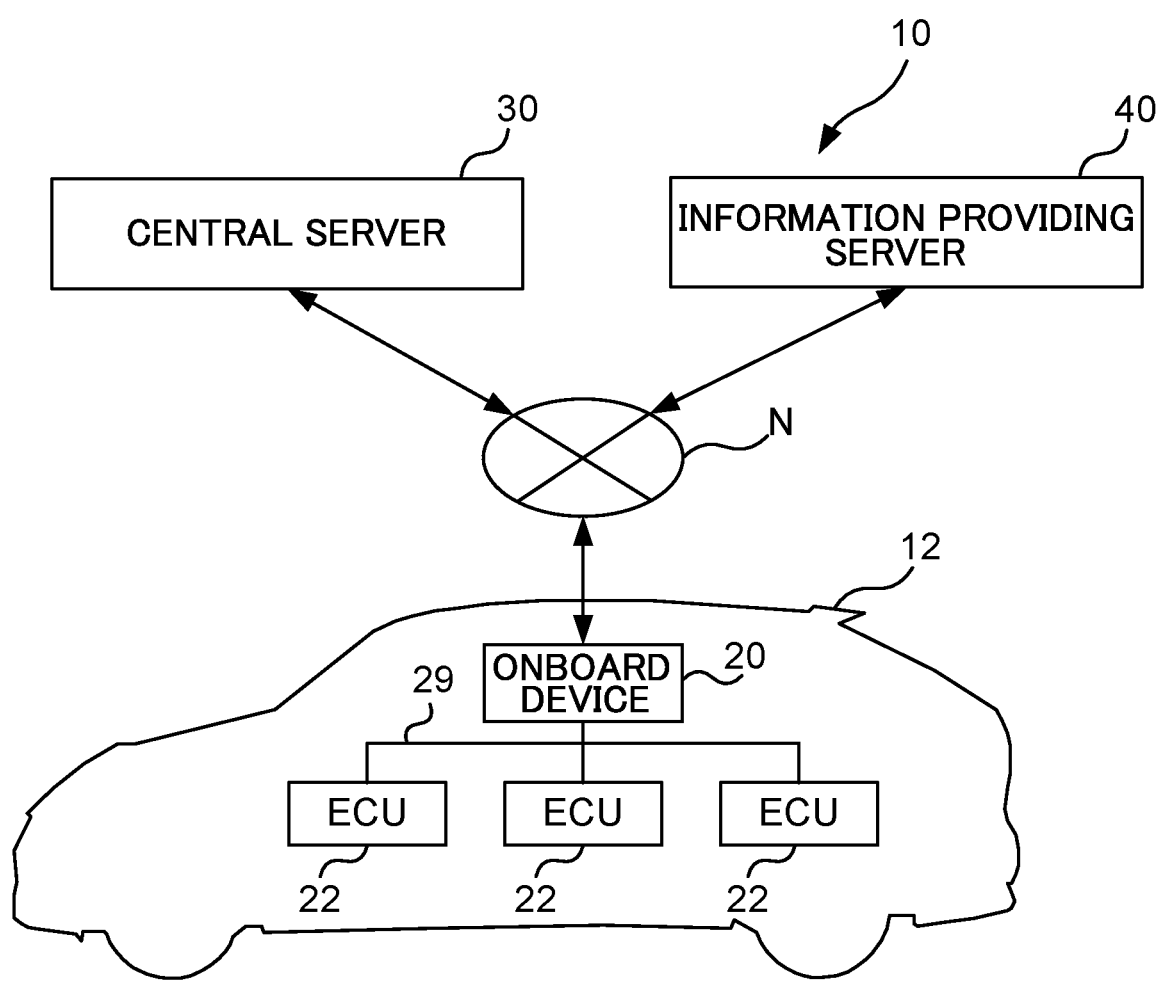
FIG. 1 is a drawing illustrating the schematic structure of a traffic jam predicting system relating to a present embodiment.

As illustrated in FIG. 1, a traffic jam predicting system 10 of the embodiment of the present disclosure is structured to include a vehicle 12, a central server 30, and an information providing server 40. An onboard device 20 serving as the onboard device is installed in the vehicle 12. The onboard device 20 and the central server 30 are connected to one another through network N.

The onboard device 20 is a device that collects vehicle information relating to the vehicle that includes position information indicating the position of the vehicle 12 and speed information indicating the speed at which the vehicle 12 is traveling, and transmits these information to the central server 30.

The central server 30 is set at the manufacturer who manufactures the vehicle 12, or at a car dealer that is affiliated with that manufacturer. The central server 30 acquires the vehicle information from the onboard device 20, and by using the vehicle information of the vehicle that is traveling on a road located in a vicinity of a facility, determines the traffic jam status that indicates the absence/presence of a traffic jam on that road.

Further, the central server 30 collects, from the information providing server 40 that is described later, weather information including the weather and the amount of precipitation, and attendance record information including the number of persons going to work of the workers who are going to work at a facility such as a company or the like and the number of persons leaving work per time range. The central server 30 predicts the traffic jam status of a road located in the vicinity of the facility, per time range, by using the acquired weather information and attendance information.

The information providing server 40 is a server that provides the weather information and the attendance record information to the central server 30. Note that the weather information relating to the present embodiment includes past results of meteorological observation, as well as future weather forecasts for the day or the like on which a traffic jam is to be predicted. Further, the attendance record information includes, as records of attendance, past numbers of persons going to work and past numbers of persons leaving work.

(Vehicle)

Figure 2:
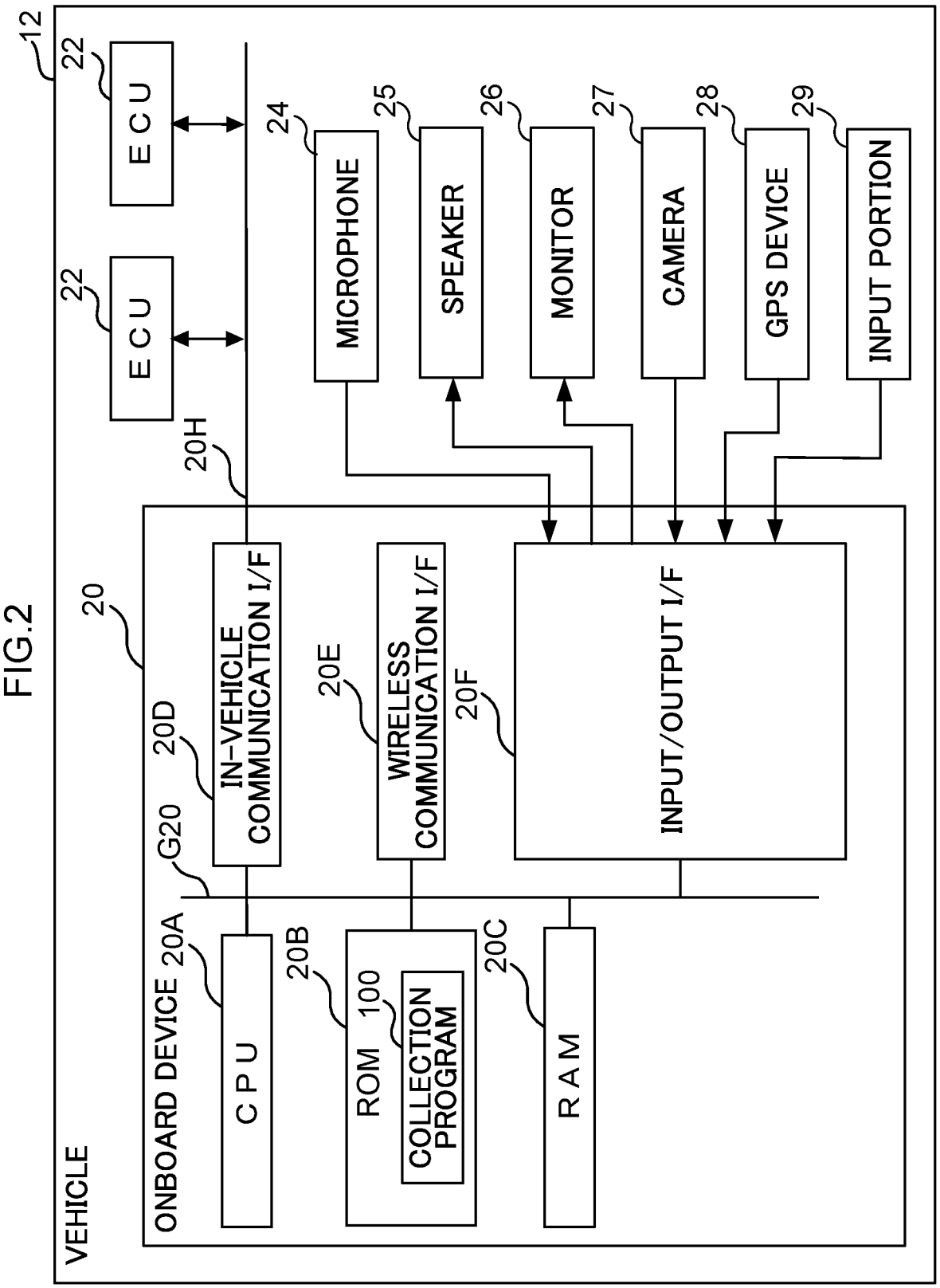
FIG. 2 is a block drawing illustrating hardware structures of a vehicle relating to the present embodiment.

As illustrated in FIG. 2, the vehicle 12 relating to the present embodiment is structured to include the onboard device 20 and plural ECUs (Electronic Control Units) 22.

The onboard device 20 is structured to include a CPU (Central Processing Unit) 20A, a ROM (Read Only Memory) 20B, a RAM (Random Access Memory) 20C, an in-vehicle communication I/F (Interface) 20D, a wireless communication I/F 20E, and an input/output I/F 20F. The CPU 20A, the ROM 20B, the RAM 20C, the in-vehicle communication I/F 20D, the wireless communication I/F 20E and the input/output I/F 20F are connected via an internal bus 20G so as to be able to communicate with one another.

The CPU 20A is a central computing processing unit, and executes various programs and controls the respective sections. Namely, the CPU 20A reads-out programs from the ROM 20B, and executes the programs by using the RAM 20C as a workspace.

The ROM 20B stores various programs and various data. A collection program 100 is stored in the ROM 20B of the present embodiment. Accompanying the execution of the collection program 100, the onboard device 20 collects respective data from unillustrated onboard equipment and sensors, and executes the processing of transmitting these data to the central server 30. The RAM 20C temporarily stores programs and data as a workspace.

The in-vehicle communication I/F 20D is an interface for connection with the respective ECUs 22. Communication standards in accordance with CAN protocol are used at this interface. The in-vehicle communication I/F 20D is connected to an external bus 20H.

The wireless communication I/F 20E is a wireless communication module for communicating with the central server 30. Communication standards such as, for example, 5G, LTE, Wi-Fi® or the like are used at this wireless communication module. The wireless communication I/F 20E is connected to the network N.

The input/output I/F 20F is an interface for communicating with a microphone 24, a speaker 25, a monitor 26, a camera 27, a GPS device 28 and an input portion 29 that are installed in the vehicle 12. Note that the microphone 24, the speaker 25, the monitor 26, the camera 27, the GPS device 28 and the input portion 29 may be directly connected to the internal bus 20G.

The ECUs 22 are electronic control modules for controlling the unillustrated onboard equipment and sensors installed in the vehicle 12. The ECUs 22 are, for example, an ADAS (Advanced Driver Assistance System) ECU, a steering ECU, an engine ECU and the like. The ECU 22 relating to the present embodiment detects the speed of the vehicle 12 from an unillustrated vehicle speed sensor.

The microphone 24 is provided at the instrument panel, the center console, a front pillar, the dashboard or the like, and is a device that collects sounds emitted by occupants of the vehicle 12.

The speaker 25 is provided at the instrument panel, the center console, a front pillar, the dashboard or the like, and is a device that outputs sounds.

The monitor 26 is provided at the instrument panel, the dashboard or the like of the vehicle 12, and is a liquid crystal monitor for displaying various information. Further, the monitor 26 of the present embodiment displays images and text indicating objects of replacement that are received from the central server.

The camera 27 is provided adjacent to the upper portion of the front windshield or the windshield rearview mirror, and is an imaging device for capturing images of the states of the occupants riding in the vehicle 12.

The GPS device 28 is a device that measures the current position of the vehicle 12. The GPS device 28 includes an unillustrated antenna that receives signals from GPS satellites. Note that the GPS device 28 may be connected to the onboard device 20 through an unillustrated car navigation system.

The input portion 29 is a touch panel, buttons or the like that receive input from persons riding in the vehicle 12.

Figure 3:
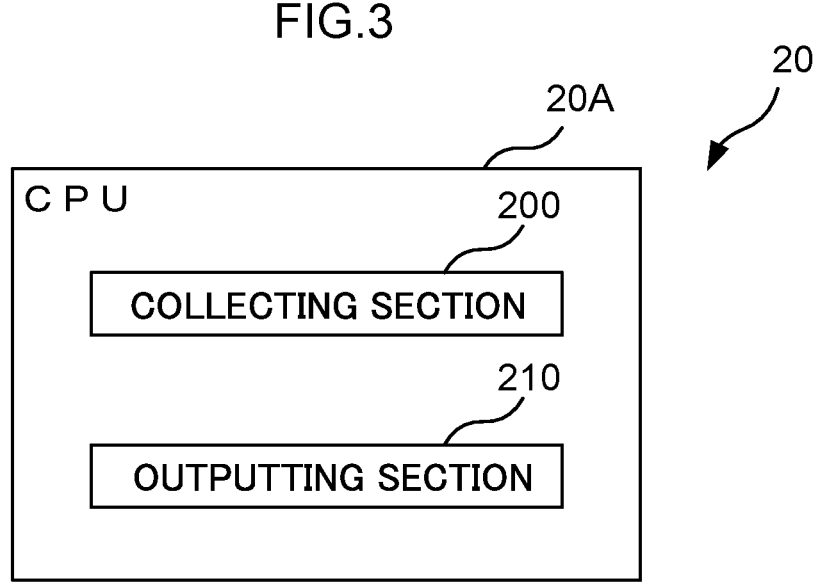
FIG. 3 is a block drawing illustrating hardware structures of an onboard device relating to the present embodiment.

As illustrated in FIG. 3, at the onboard device 20 of the present embodiment, the CPU 20A functions as a collecting section 200 and an outputting section 210 by executing the collection program 100.

The collecting section 200 has the function of collecting, from the ECUs 22 and as vehicle information, speed information that is detected by a sensor and position information that is acquired by the GPS device 28.

The outputting section 210 has the function of outputting the collected vehicle information to the central server 30.

(Central Server)

Figure 4:
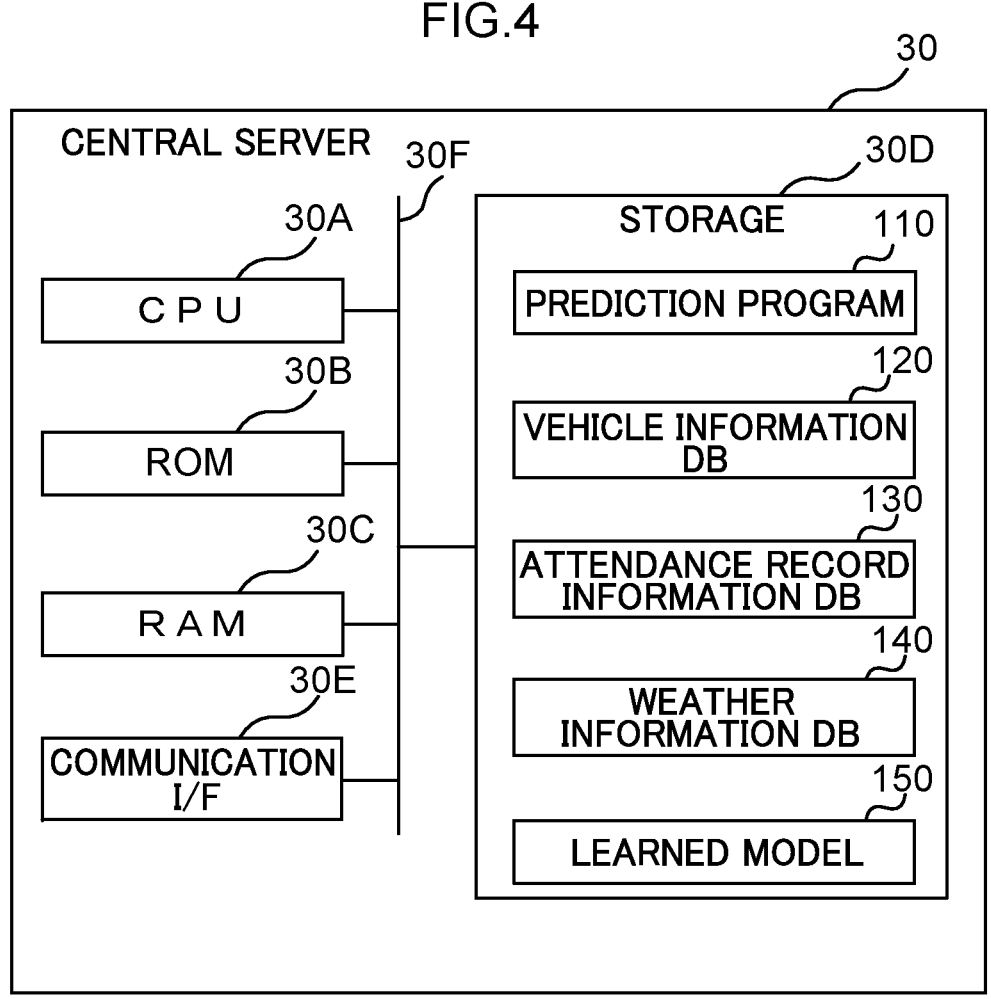
FIG. 4 is a block drawing illustrating hardware structures of a central server relating to the present embodiment.

As illustrated in FIG. 4, the central server 30 is structured to include a CPU 30A, a ROM 30B, a RAM 30C, a storage 30D and a communication I/F (Interface) 30E. The CPU 30A, the ROM 30B, the RAM 30C, the storage 30D and the communication I/F 30E are connected via an internal bus 30F so as to be able to communicate with one another. The functions of the CPU 30A, the ROM 30B, the RAM 30C and the communication I/F 30E are the same as those of the CPU 20A, the ROM 20B, the RAM 20C and the wireless communication I/F 20E of the above-described onboard device 20. Note that the communication I/F 30E may carried out wired communication.

The storage 30D that serves as the memory is structured by an HDD (Hard Disk Drive) or an SSD (Solid State Drive), and stores various programs and various data. A prediction program 110, a vehicle information DB (database) 120, an attendance record information DB 130, a weather information DB 140 and a learned model 150 are stored in the storage 30D of the present embodiment. Note that the ROM 30B that serves as the memory may store the prediction program 110, the vehicle information DB 120, the attendance record information DB 130, the weather information DB 140 and the learned model 150.

The prediction program 110 that serves as the program is a program for controlling the central server 30. Accompanying the execution of the prediction program 110, the central server 30 acquires vehicle information from the onboard device 20, and acquires attendance record information, which serves as the number of persons information, and weather information from the information providing server 40. By using the acquired vehicle information, attendance record information and weather information, the central server 30 generates the learned model 150 that is described later, and carries out prediction of the traffic jam status.

The vehicle information DB 120 stores vehicle information acquired from the plural vehicles 12. The attendance record information DB 130 stores attendance record information acquired from the information providing server 40. The weather information DB 140 acquires weather information that is acquired from the information providing server 40 and that includes results of observation and forecasts.

The learned model 150 is learned model that has machine-learned vehicle information, attendance record information and weather information. The learned model 150 predicts the traffic jam status per time range by using the number of persons going to work on the day that is the object of prediction for which prediction is carried out, and the number of persons leaving work per time range, and the weather information. Here, the learned model 150 predicts the traffic jam status by using a random forest. A random forest derives results of prediction by generating plural decision tree groups having little correlation with one another, and aggregating and averaging the results of prediction thereof. The control parameters of the random forest are the selected number of explanatory variables, the number of forks of the decision tree, the threshold values that are set in the queries within the decision trees, and the like. Note that the learned model 150 relating to the present embodiment is described as using a random forest, but is not limited to this. The learned model 150 may be a neural network, or may be a support vector machine.

Figure 5:
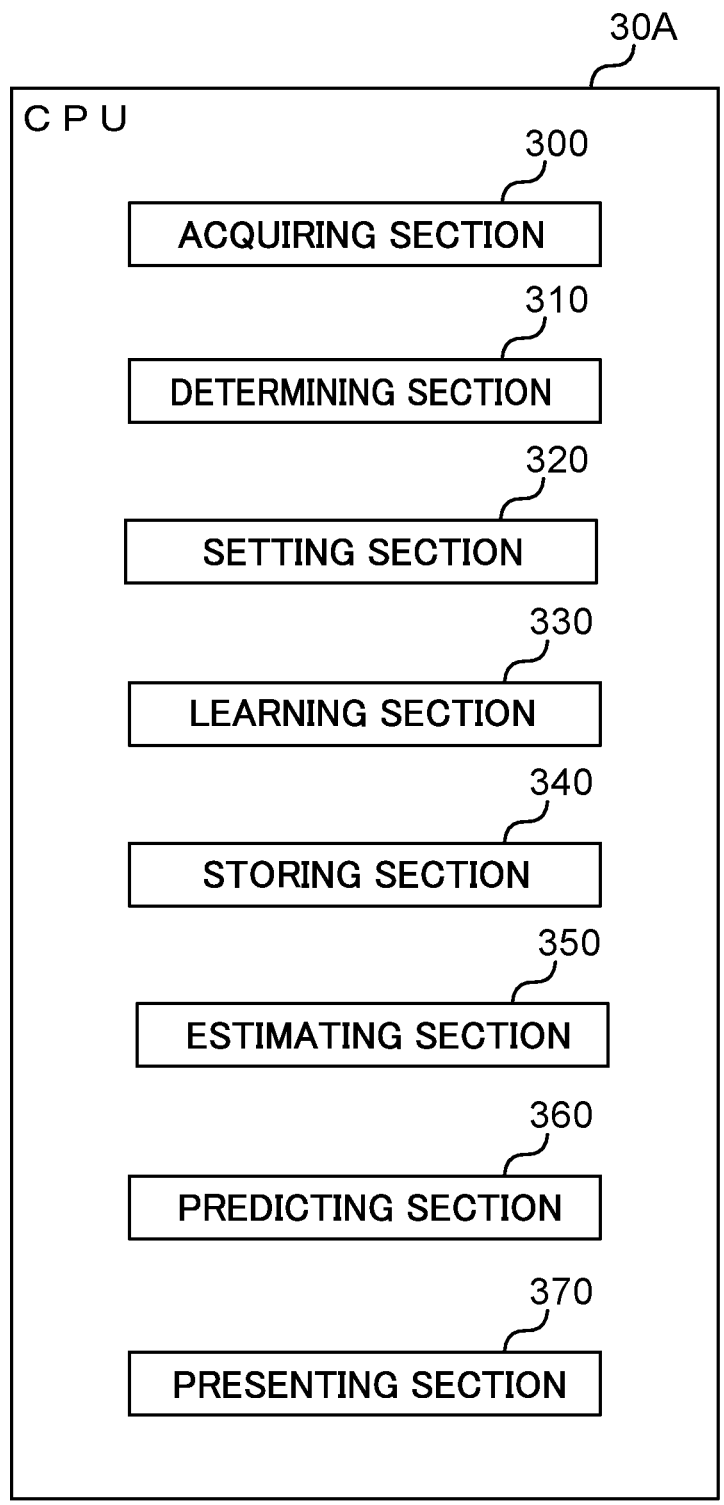
FIG. 5 is a block drawing illustrating functional structures of the central server relating to the present embodiment.

The functions of the central server are described next with reference to FIG. 5. As an example, as illustrated in FIG. 5, at the central server 30 of the present embodiment, due to the CPU 30A that serves as the processor executing the prediction program 110, the CPU 30A functions as an acquiring section 300, a determining section 310, a setting section 320, a learning section 330, a storing section 340, an estimating section 350, a predicting section 360 and a presenting section 370.

The acquiring section 300 has the function of acquiring vehicle information transmitted from the onboard device 20 of the vehicle 12, and weather information and attendance record information transmitted from the information providing server 40.

By using the acquired vehicle information, the determining section 310 determines the traffic jam status that indicates the absence/presence of a traffic jam on a road located in a vicinity of a facility. Specifically, the determining section 310 sections the road into segments of a predetermined distance (e.g., 50 m) each from an intersection located in a vicinity of the facility, and, by using the vehicle information, derives the necessary time that is needed for the vehicles 12 to pass through each segment. The determining section 310 derives the average needed time of the vehicles 12 that pass through each segment, for each of respective time ranges, and detects the segments in which the average needed time exceeds the threshold value, and the number of such segments that are continuous. For each of the respective time ranges, the determining section 310 determines, as the traffic jam status, that a traffic jam has arisen if the number of detected continuous segments is greater than or equal to a predetermined threshold value (i.e., if the segments at which the average needed time exceeds the threshold value are greater than or equal to a predetermined distance).

FIG. 6 illustrates, as an example, average needed times in the predetermined segments, per time range. For example, as illustrated in FIG. 6, the determining section 310 derives the average needed time in each segment per time range. The determining section 310 detects segments in which the average needed time is greater than or equal to 4.0 seconds. Here, in FIG. 6, the places that are shaded are segments that the determining section detects.

In a case in which there are eight (400 m) or more continuous segments that are detected for a given time range, the determining section 310 determines that a traffic jam has arisen in that time range. For example, as illustrated in FIG. 6, in time range e (from 17:00 to 17:15), the determining section 310 detects segment A through segment I whose average needed times are greater than or equal to 4.0 seconds, and, because nine of the detected segments are continuous, the determining section 310 determines that a traffic jam has arisen in time range 3.

Note that the starting point (the point of 0 m) at the time of setting the segments illustrated in FIG. 6 as an example is, for example, an intersection or the like, but is not limited to this. Any place may be used as the starting point (the point of 0 m) provided that it is a place where there is a reason for a traffic jam to arise. For example, the starting point may be a place where the number of lanes or the width of the road decreases, a place where construction is being carried out, a place where an accident has occurred, or a place where acceleration decreases such as an uphill grade or the like.

The setting section 320 illustrated in FIG. 5 sets the learning data illustrated as an example in FIG. 7, by using the traffic jam status determined by the determining section 310, the weather information and the attendance record information.

As illustrated in FIG. 7, the learning data is set to include weather information, attendance record information, and results of determining. The learning data includes, as the weather information, the date, the time range, a calendar, the weather, and the amount of precipitation. The learning data includes, as the attendance record information, the attendance rate of workers, the number of persons leaving work, the number of persons who left work one time period ago, the number of persons who left work two time periods ago, and the number of persons who left work three time periods ago. The learning data includes the traffic jam status as the results of determining. Here, the date means the date that is the object of data acquisition. The time range means the time range that is the object of data acquisition. The calendar is information indicating characteristics of the object date, such as the beginning/middle/end of the month, a weekday, a holiday, or the like. Further, the weather is information relating to the weather on the object date, and the amount of precipitation is the amount of rain that falls on the object date. The attendance rate is the ratio of the number of workers who go to work on the object date, with respect to the total number of persons who are workers at the facility. The number of persons leaving work is the number of workers who leave the facility in each time range. In the case of time range d, the number of persons who left work one time period before is, for example, the number of persons who left work in time range c, and the number of persons who left work two time periods before is the number of persons who left work in time range b that is two time periods before, and the number of persons who left work three time periods before is the number of persons who left work in time range a that is three time periods before. In other words, as the learning data, the setting section 320 sets, as the number of persons leaving work of a given time period, the "number of persons who left work one time period before" of one time period ago, and the "number of persons who left work two time periods before" of two time periods ago, and the "number of persons who left work three time periods before" of three time periods ago, respectively. Due thereto, the learning data includes the number of persons who left work of time ranges before the time range for which the traffic jam prediction is carried out, and it is possible to predict the traffic jam status while taking into account the time that is needed from a worker leaving work until arriving at the road that is the object of prediction.

Further, by using the weather information and the results of estimation that are estimated by the estimating section 350 that is described later, the setting section 320 sets set data for carrying out traffic jam prediction. As illustrated in FIG. 8 as an example, the set data is set so as to include weather information and the results of estimation. The set data includes, as the weather information, the date, the time range, the calendar, the weather and the amount of precipitation. The set data includes, as the results of estimation, an estimated attendance rate of the workers and an estimated number of persons leaving work which are estimated by the estimating section 350 described later, as well as the number of persons who left work one time period before, the number of persons who left work two time periods before, and the number of persons who left work three time periods before. Here, the estimated number of persons leaving work relating to the present embodiment is an example of the "estimated number of persons information".

By using the learning data illustrated in FIG. 7, the learning section 330 illustrated in FIG. 5 executes machine learning for predicting a traffic jam, and generates the learned model 150. Specifically, the learning section 330 carries out machine learning by using, as input data, the weather information and the attendance record information that are included in the learning data, and by using, as teaching data, the input data included in the learning data and the traffic jam status corresponding to the input data.

The storing section 340 stores the learned model 150 generated by the learning section 330. Further, the storing section 340 stores the vehicle information, the attendance record information and the weather information acquired by the acquiring section 300 in the vehicle information DB 120, the attendance record information DB 130 and the weather information DB 140, respectively.

The estimating section 350 compiles statistics by using past attendance record information stored in the attendance record information DB 130, and estimates the number of workers who go to work at the facility on the day that is the object of estimation. Specifically, by using attendance record information of the past, the estimating section 350 derives the number of workers who go to work on the day that is the object of prediction (hereinafter called "estimated number of persons") from the average value that is a moving average of the number of workers who have gone to work on that same day of the week for the past four weeks (e.g., the number of persons who have gone to work on Wednesdays). By using the estimated number of persons that has been derived, the estimating section 350 estimates the proportion (hereinafter called "estimated attendance rate") of the estimated number of persons with respect to the total number of workers.

Figure 9:
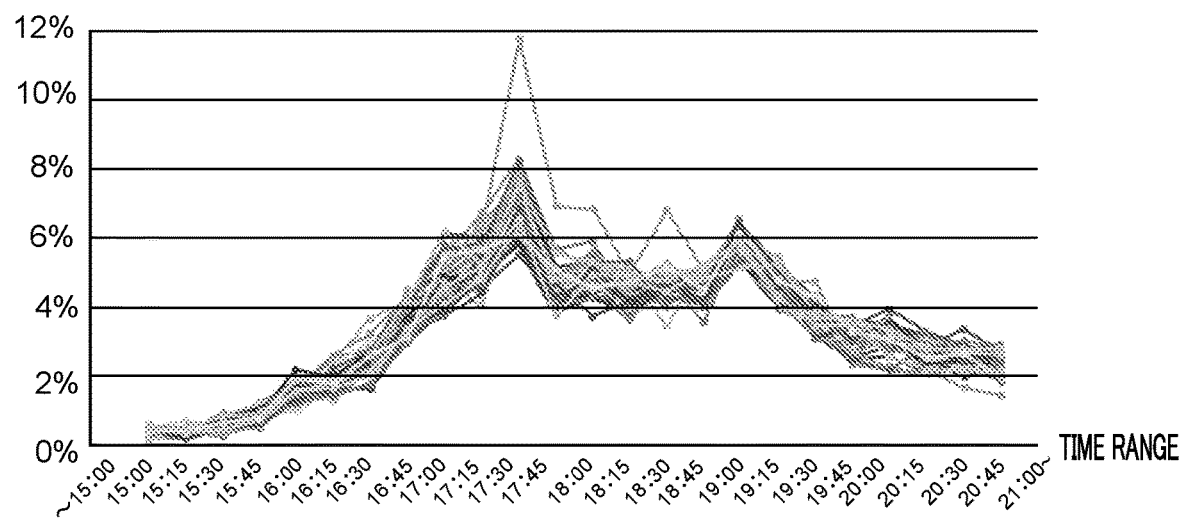
FIG. 9 is a graph that illustrates an example of the proportion of the number of persons leaving work, per date and per time range, and that is provided in order to explain estimation of the number of persons leaving work relating to the present embodiment.

Further, as illustrated in FIG. 9 as an example, the estimating section 350 compiles statistics by using the past attendance record information, and derives the proportion of the number of workers who leave work with respect to the number of workers who have gone to work, for each date and each time range. By using the proportion of the number of workers who leave work that has been derived and the estimated number of persons that has been estimated, the estimating section 350 estimates the number of workers who leave work (hereinafter called "estimated number of persons leaving work") in each time range on the day that is the object of prediction.

By using the set data illustrated in FIG. 8, the predicting section 360 predicts the traffic jam status for each time range on the day that is the object of prediction. Specifically, by inputting the set data to the learned model 150, the predicting section 360 predicts the traffic jam status for each time range on the day that is the object of prediction.

Figure 10:
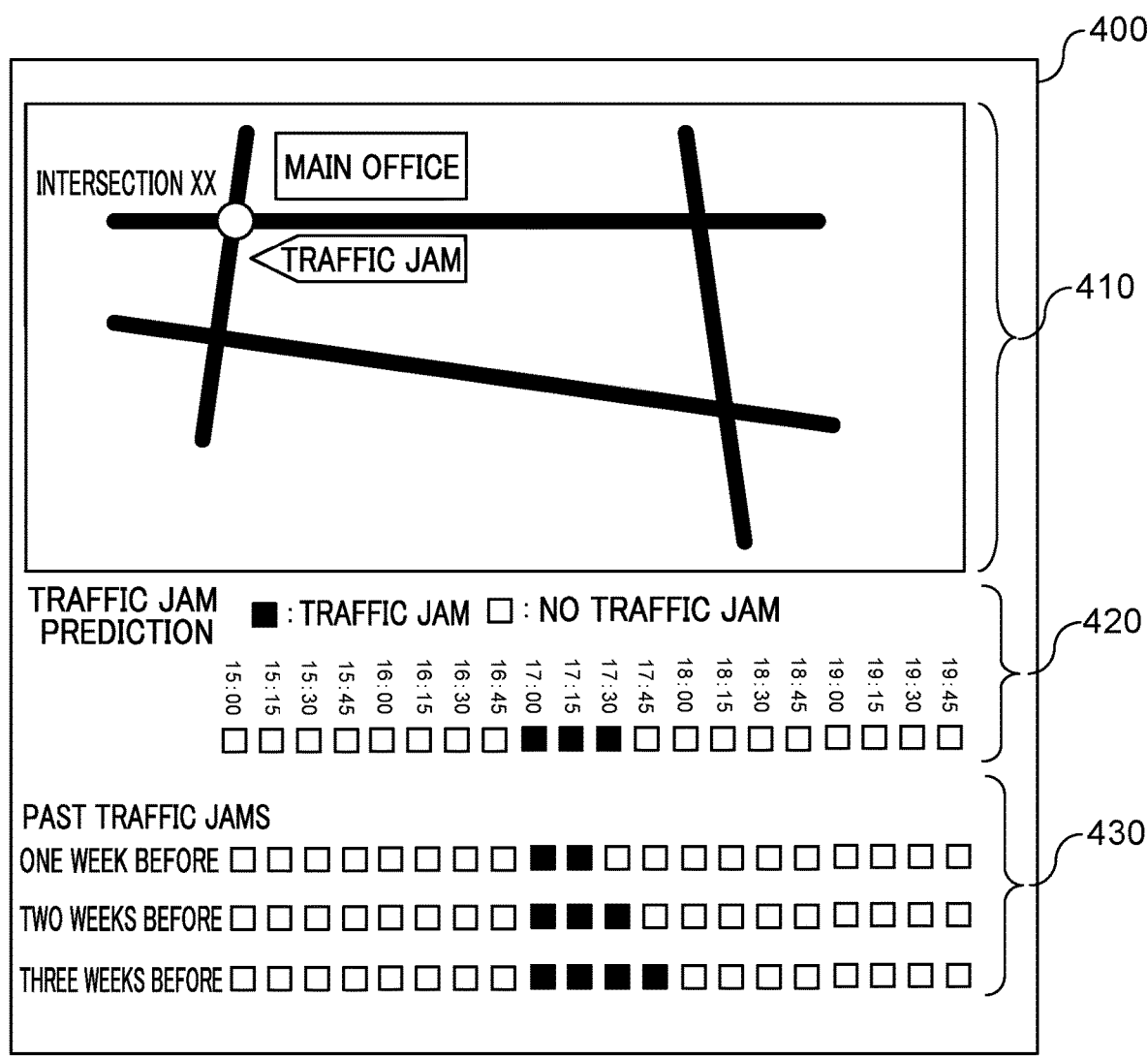
FIG. 10 is a schematic drawing illustrating a screen that displays results of prediction relating to the present embodiment.

The presenting section 370 presents the results of prediction that have been predicted by the predicting section 360. Specifically, the presenting section 370 presents a prediction presenting screen 400 that is illustrated in FIG. 10. The prediction presenting screen 400 illustrated as an example in FIG. 10 includes an object road presenting region 410, a predicted results presenting region 420, and an observed results presenting region 430. The object road presenting region 410 presents the road whose traffic jam status is predicted, by using a map or the like. The predicted results presenting region 420 presents the results of prediction for each time range, which were predicted by the predicting section 360. The observed results presenting region 430 presents the results of determining on the traffic jam status, for each time range on the same day of the week (e.g., Wednesday), of one week before, two weeks before and three weeks before.

Figure 11:
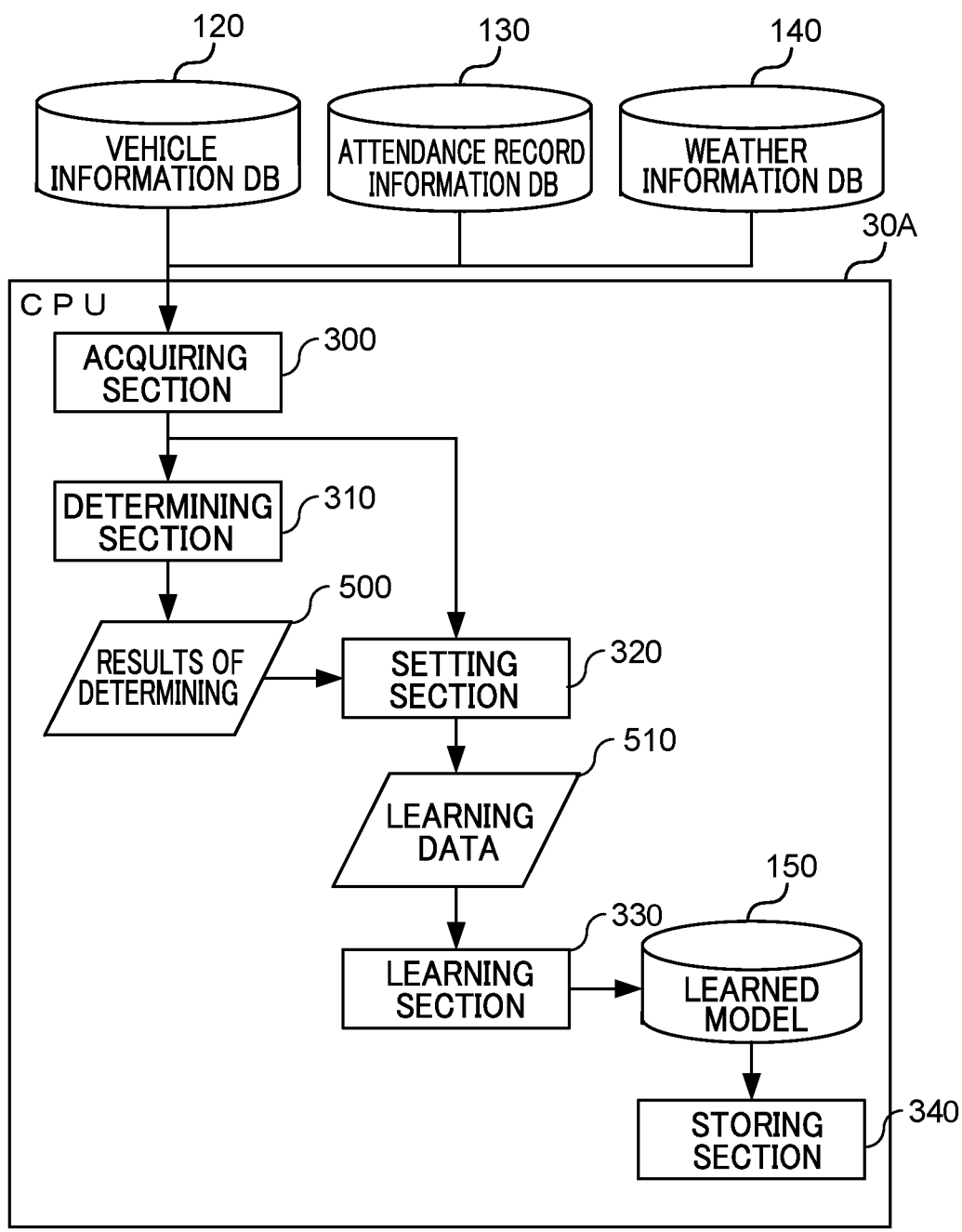
FIG. 11 is a data flow diagram illustrating the flow of data in processing that generates a learned model relating to the present embodiment.
Figure 12:
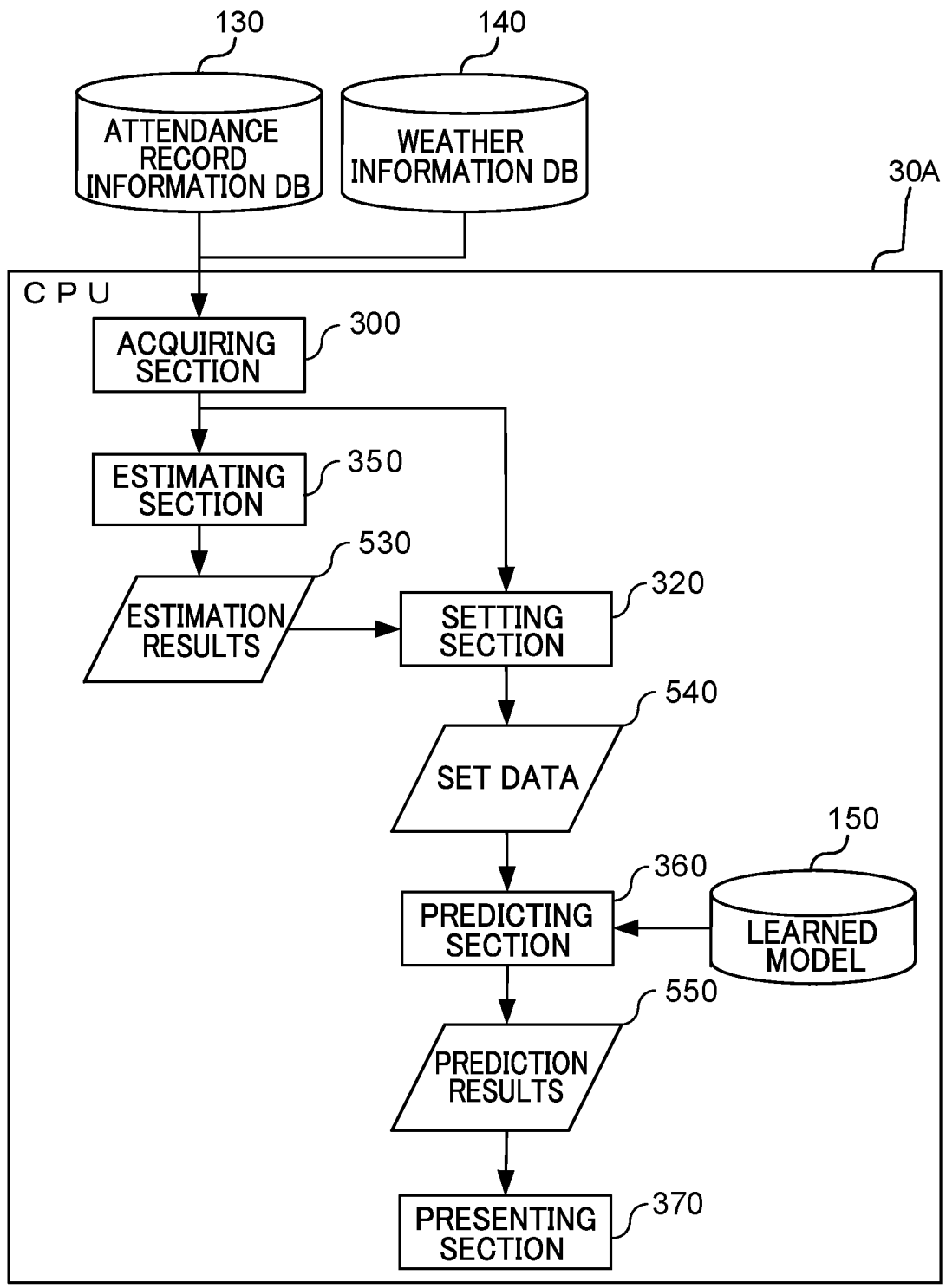
FIG. 12 is a data flow diagram illustrating the flow of data in processing that predicts traffic jam status relating to the present embodiment.

Before describing the operation of the traffic jam predicting system 10, the flows of data in the learning phase in which the learned model 150 is generated, and in the predicting phase in which a traffic jam is predicted, at the central server 30 that serves as the traffic jam predicting device will be described with reference to FIG. 11 and FIG. 12. FIG. 11 is a data flow diagram illustrating an example of the flow of data at the central server 30 in the learning phase in which the learned model 150 is generated.

First, the flow of data in the learning phase is described with reference to FIG. 11. As illustrated in FIG. 11, the acquiring section 300 acquires vehicle information, attendance record information and weather information from the vehicle information DB 120, the attendance record information DB 130 and the weather information DB 140. The acquiring section 300 inputs the vehicle information to the determining section 310, and inputs the attendance record information and the weather information to the setting section 320.

As illustrated in FIG. 6, the determining section 310 detects the average needed time per predetermined segment and per time range by using the vehicle information, and determines the traffic jam status as determining results 500. The determining section 310 inputs the determined traffic jam status to the setting section 320.

By using the inputted attendance record information, weather information and traffic jam status, the setting section 320 sets learning data 510, and inputs the learning data 510 to the learning section 330. Here, by using the number of persons leaving work that is included in the attendance record information, the setting section 320 sets the number of persons who left work one time period before, the number of persons who left work two time periods before and the number of persons who left work three time periods before, respectively, in the learning data 510. Further, the setting section 320 sets the learning data 510 so as to be divided into training data and test data.

The learning section 330 executes machine learning by using the inputted learning data 510, and generates the learned model 150, and inputs the learned model 150 to the storing section 340. Here, the learning section 330 generates the learned model 150 by using the training data among the learning data 510, and evaluates the generated learned model 150 by using the test data.

The storing section 340 stores the inputted learned model 150 in the storage 30D.

The flow of data in the predicting phase is described next with reference to FIG. 12. As illustrated in FIG. 12, the acquiring section 300 acquires attendance record information and weather information from the attendance record information DB 130 and the weather information DB 140. The acquiring section 300 inputs the attendance record information to the estimating section 350, and inputs the weather information to the setting section 320.

The estimating section 350 compiles statistics by using the inputted attendance record information, and estimates the estimated attendance rate of the day that is the object of estimation, and the estimated number of persons leaving work for each time range. The estimating section 350 inputs the estimated attendance rate and the estimated numbers of persons leaving work to the setting section 320 as estimation results 530.

By using the estimated attendance rate, the estimated numbers of persons leaving work and the weather information that have been inputted, the setting section 320 sets set data 540, and inputs the set data 540 to the predicting section 360. Here, by using the estimated numbers of persons leaving work, the setting section 320 sets the number of persons leaving work of one time period before, the number of persons leaving work of two time periods before and the number of persons leaving work of three time periods before, respectively, in the set data 540.

By using the learned model 150 stored in the storage 30D, the predicting section 360 predicts the traffic jam status that is based on the inputted set data 540, and inputs prediction results 550 to the presenting section 370.

By using the prediction results 550 that are inputted, the presenting section 370 presents the prediction presenting screen 400. Here, the presenting section 370 acquires the vehicle information and presents, together with the prediction results 550, the traffic jam information per time range on that same day of the week in the past. Note that, in a case in which the presenting section 370 receives an instruction from the user to present the prediction results 550, the presenting section 370 transmits and presents the prediction presenting screen 400 to the terminal operated by the user as the prediction results 550.

(Flow of Control)

Figure 13:
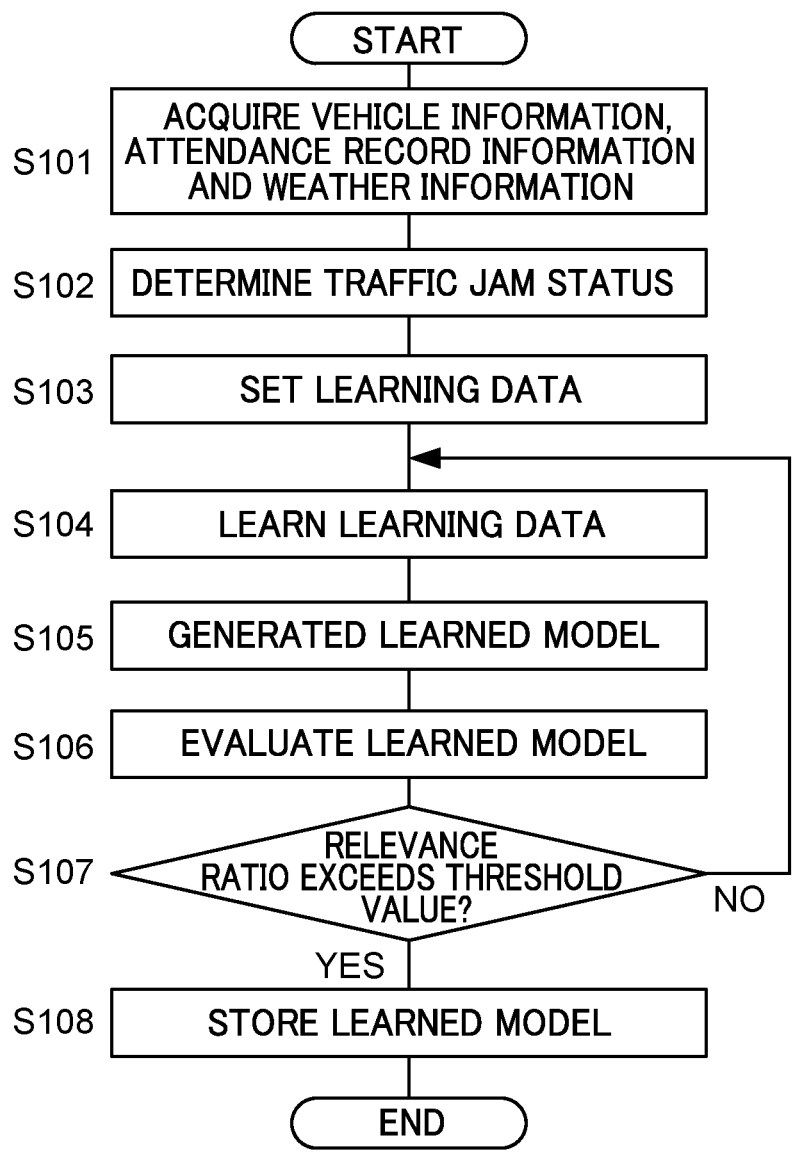
FIG. 13 is a flowchart illustrating the flow of learned model generating processing that is executed at the central server of the present embodiment.

The flow of processings executed at the traffic jam predicting system 10 of the present embodiment is described by using the flowcharts of FIG. 13 and FIG. 14. The respective processings at the central server 30 are executed due to the CPU 30A of the central server 30 functioning as the acquiring section 300, the determining section 310, the setting section 320, the learning section 330, the storing section 340, the estimating section 350, the predicting section 360 and the presenting section 370. The generating processing illustrated in FIG. 13 is executed in a case in which, for example, an instruction to execute the processing of generating the learned model 150 is inputted.

In step S101, the CPU 30A acquires vehicle information, attendance record information and weather information.

In step S102, the CPU 30A determines the traffic jam status by using the vehicle information.

In step S103, the CPU 30A sets the learning data by using the attendance record information, the weather information and the traffic jam status.

In step S104, the CPU 30A executes machine learning by using the training data of the learning data.

In step S105, the CPU 30A generates the learned model 150 as the results of executing machine learning.

In step S106, by using the test data of the learning data, the CPU 30A carries out evaluation of the learned model 150 that was generated. Here, the relevance ratio of the prediction of the traffic jam status by the learned model and the traffic jam status included in the test data is derived as the results of evaluation.

In step S107, the CPU 30A determines whether or not the relevance ratio that was derived as the results of evaluation exceeds a threshold value. If the relevance ratio exceeds the threshold value (step S107: YES), the CPU 30A moves on to step S108. On the other hand, if the relevance ratio does not exceed the threshold value (i.e., if the relevance ratio is less than or equal to the threshold value) (step S107: NO), the CPU 30A moves on to step S104, and executes machine learning again.

In step S108, the CPU 30A stores the generated learned model 150 in the storage 30D.

Next, the flow of the processing of predicting a traffic jam, which is executed at the central server 30 of the present embodiment, is described with reference to FIG. 14.

In step S201, the CPU 30A acquires attendance record information and weather information.

In step S202, by using the acquired attendance record information, the CPU 30A estimates the estimated attendance rate and the estimated numbers of persons leaving work as the results of estimation.

In step S203, the CPU 30A sets the set data by using the results of estimation and the weather information.

In step S204, by using the set data, the CPU 30A predicts the traffic jam status as the results of prediction.

In step S205, the CPU 30A determines whether or not traffic jam statuses of all of the time ranges on the day that is the object of prediction have been predicted. If the traffic jam statuses of all of the time ranges have been predicted (step S205: YES), the CPU 30A moves on to step S206. On the other hand, if the traffic jam statuses of all of the time ranges have not been predicted (i.e., if there is a time range whose traffic jam status has not been predicted) (step S205:

NO), the CPU 30A moves on to step S204, and predicts the traffic jam status of the time range for which prediction has not been carried out.

In step S206, the CPU 30A presents the predicted traffic jam statuses on the prediction presenting screen 400 as the results of prediction.

In step S207, the CPU 30A determines whether or not to end the predicting processing. If processing is to be ended (step S207: YES), the CPU 30A ends the processing of predicting. On the other hand, if processing is not to be ended (step S207: NO), the CPU 30A moves on to step S201, and acquires attendance record information and weather information.

Overview of Embodiment

The central server 30 of the present embodiment determines the traffic jam status of a road located in the vicinity of a facility from vehicle information acquired from the vehicles 12, and generates the learned model 150 that has machine-learned the weather information, the attendance record information, and the traffic jam status. The central server 30 estimates the estimated attendance rate of the day that is the object of prediction and the estimated number of persons leaving work per time range, which are estimated from the attendance record information, and, by using the learned model 150, predicts the traffic jam status per time range on the day that is the object of prediction.

As described above, in accordance with the present embodiment, the situation of a road over a long period of time can be predicted.

[Notes]

Note that the above embodiment describes a form in which the presenting section 370 acquires vehicle information and carries out determining of the traffic jam status, and presents the results of determining, and the traffic jam information per time range on that same day of the week in the past, and the results of prediction. However, the present disclosure is not limited to this. For example, the presenting section 370 may acquire the results of determining that are determined by the determining section 310, and present the results of determining together with the results of prediction.

Further, any of various types of processors other than a CPU may execute the respective processings that are executed due to the CPU 20A and the CPU 30A reading-in software (programs) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

The above embodiment describes a form in which the respective programs are stored in advance (are installed) on a non-transitory, computer-readable storage medium. For example, the prediction program 110 at the central server 30 is stored in advance in the ROM 30B. However, the present disclosure is not limited to this, and the respective programs may be provided in forms of being stored on a non-transitory storage medium such as a CD-ROM (Compact Disc Read Only Memory, a DVD-ROM (Digital Versatile Disc Read Only Memory), a USB (Universal Serial Bus) memory, or the like. Further, the programs may be in forms of being downloaded from an external device over a network.

The flows of the processings described in the above embodiment are examples, and unnecessary steps may be deleted therefrom, new steps may be added thereto, or the order of processings may be changed, within a scope that does not depart from the gist of the present disclosure.

What is claimed is:

1. A traffic jam predicting device comprising:
   a memory that serves as a non-transitory storage medium storing a program that causes a processor to execute processing that
   acquires number of persons information that indicates a number of users, including users who ride in vehicles, who depart from a facility at each of a predetermined time period, weather information for each predetermined time period, and vehicle information relating to vehicles traveling in a periphery of the facility;
   determines traffic jam status that indicates absence/presence of a traffic jam on a road located in a vicinity of the facility in the predetermined time period, by using the vehicle information;
   generates a learned model for predicting a traffic jam of a road by machine learning using, as teaching data, the number of persons information, the weather information, and the traffic jam status that is associated with the number of persons information and the weather information; and
   predicts the traffic jam status of a road located in a vicinity of the facility by inputting the weather information and estimated number of persons information that indicates a number of users, including users who ride in vehicles, who are estimated to have departed from the facility in each predetermined time period;
   the traffic jam predicting device further comprising:
   a processor coupled to the memory,
   wherein the processor is configured to:
   estimate the estimated number of persons information in an object time period for which prediction of the traffic jam status is to be carried out, and
   predict the traffic jam status in the object time period by inputting the estimated number of persons information and the weather information to the learned model;
   wherein the processor is further configured to provide a user with a road whose traffic jam status is predicted by using a map, results of predicting for each predetermined time period, being predicted in the object time period, and a traffic jam status for each predetermined period on a past same day of a past week in the object time period, on one screen in a prediction presenting screen displaying the predicted traffic jam status in the object time period, resulting from receiving an instruction from the user.

2. The traffic jam predicting device of claim 1, wherein the number of persons information includes a number of users relating to a time period that is before a time period in which the traffic jam status is determined.

3. The traffic jam predicting device of claim 1, wherein:
   the vehicle information includes position information relating to a position of the vehicle and speed information relating to a speed of the vehicle, and the determining of the traffic jam status uses the position information and the speed information.

4. The traffic jam predicting device of claim 3, further comprising:
deriving a needed time that is needed in order to pass through a predetermined segment by using the position information and the speed information, and
determining the traffic jam status to be that there is a traffic jam in a case in which there exists, in continuation, a predetermined number of segments whose needed time is greater than or equal to a threshold value.

5. The traffic jam predicting device of claim 1, wherein the learned model is a model using a random forest.

6. The traffic jam predicting device of claim 1, wherein the processor is configured to estimate the estimated number of persons information in the object time period by using a past number of users who have visited the facility.

7. The traffic jam predicting device of claim 1, wherein the processor is configured to present the estimated traffic jam status of each object time period.

8. The traffic jam predicting device of claim 1, wherein the processor is further configured to provide a plurality of time numbers indicating each time for the each predetermined time period, and a plurality of square marks indicating the absence/presence of the traffic jam by different color, corresponding to the each time, in the prediction presenting screen, and wherein the plurality of square marks include a first square mark indicating the absence/presence of the traffic jam in the object time period as the results of prediction, and a second square mark indicating the absence/presence of the traffic jam on the past same day of the past week in the object time period.

* * * * *